E. H. KELLEY.
MECHANICAL MOVEMENT.
APPLICATION FILED JUNE 27, 1910.
1,188,790.
Patented June 27, 1916.
3 SHEETS—SHEET 1.
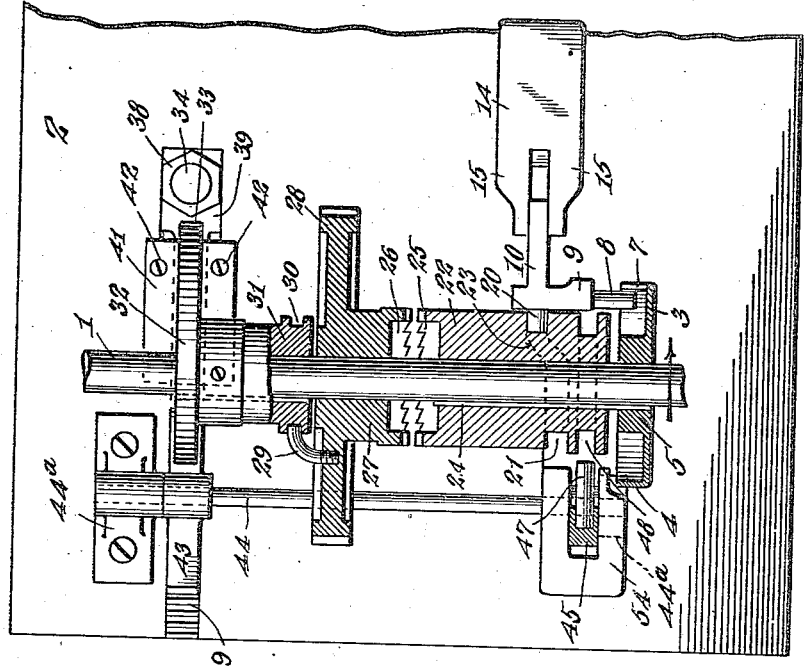
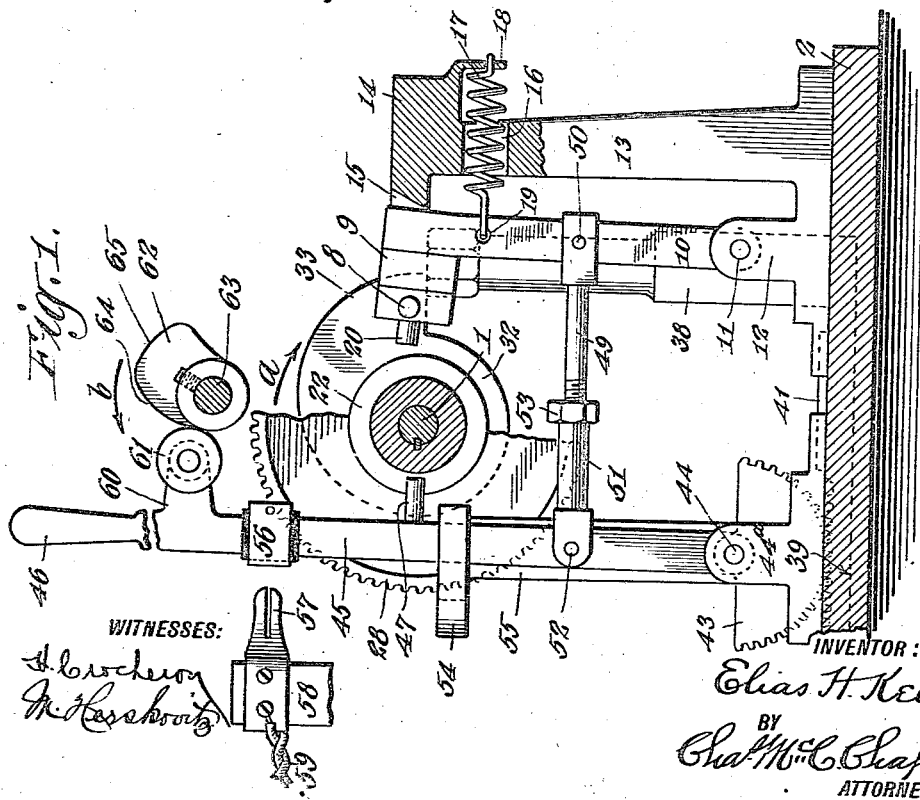
WITNESSES:
INVENTOR:
Elias H. Kelley
BY
Chas. McC. Chapman,
ATTORNEY.

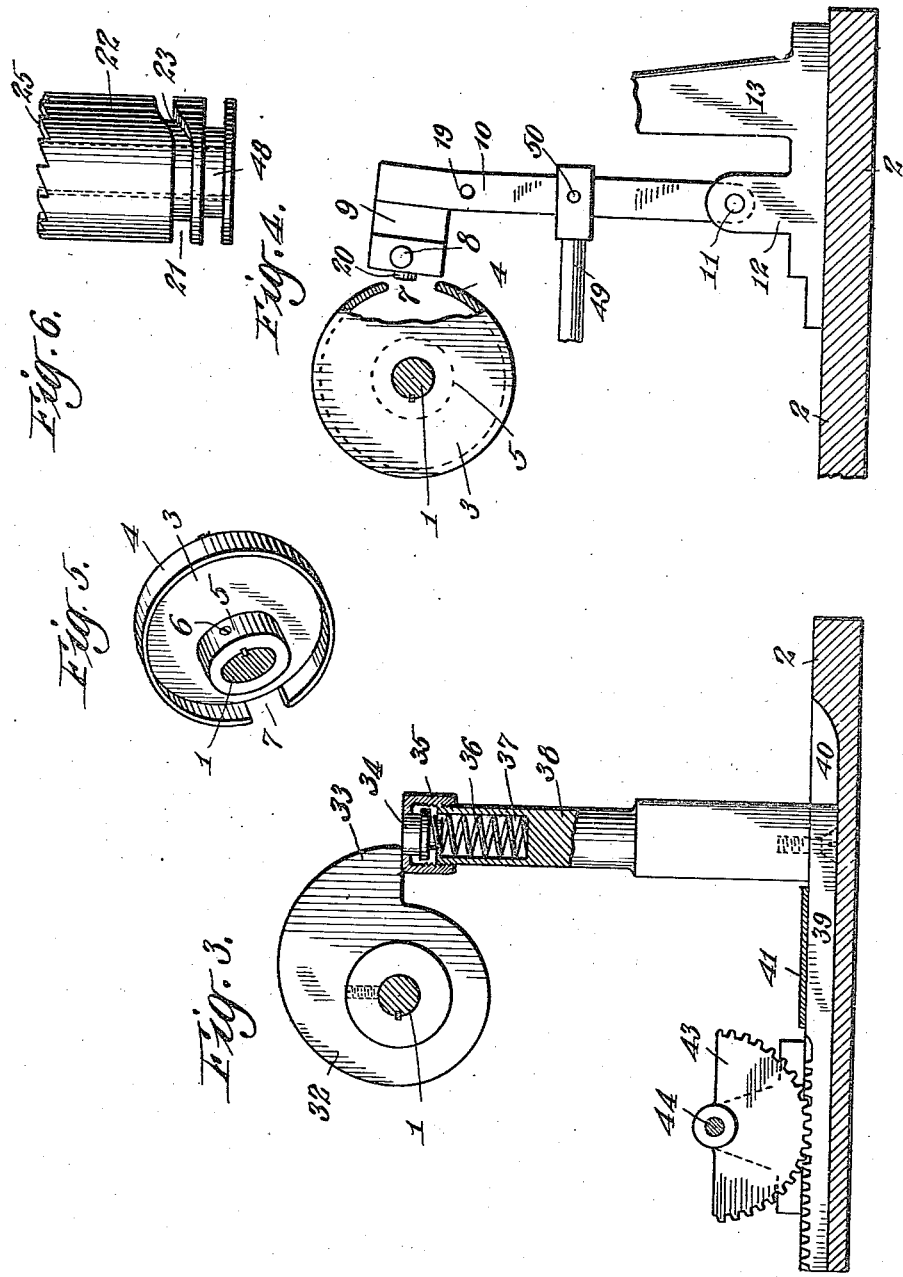

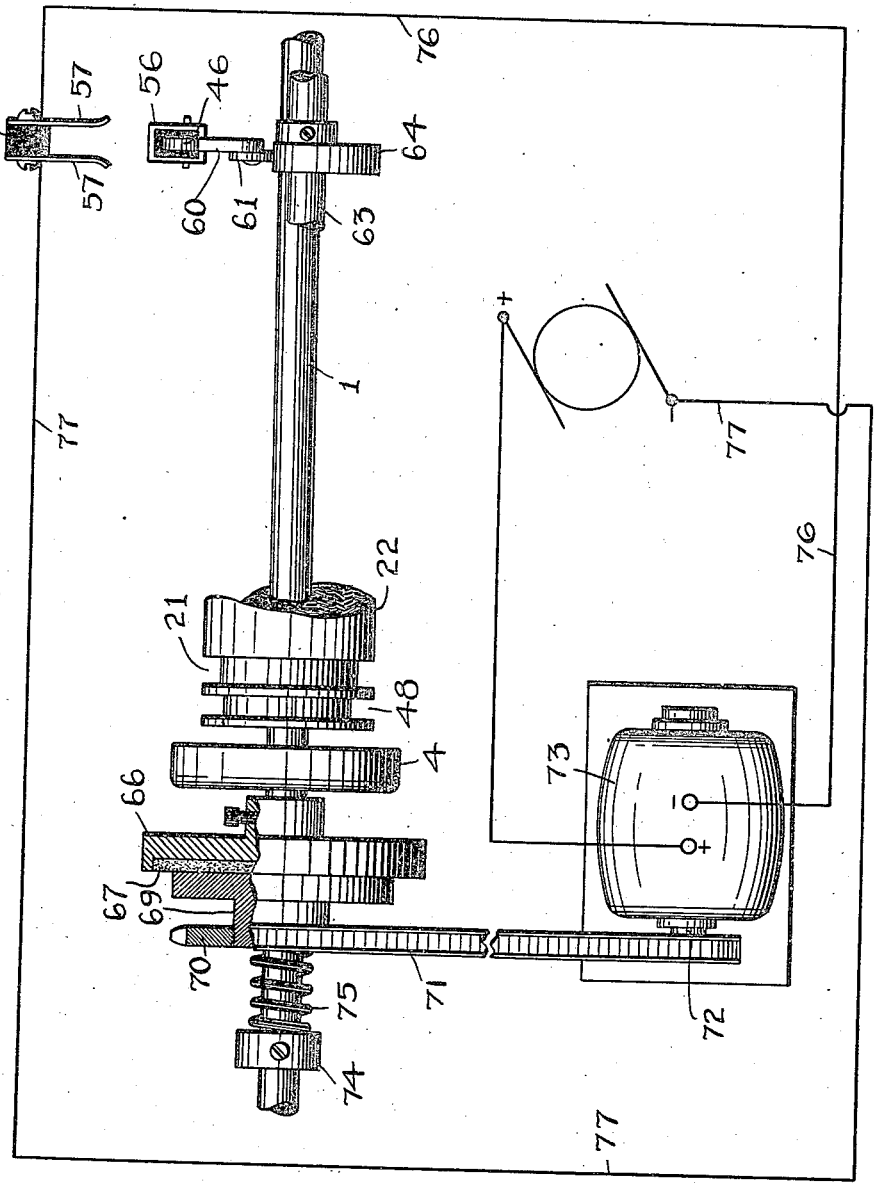

UNITED STATES PATENT OFFICE.

ELIAS H. KELLEY, OF NEW YORK, N. Y.

MECHANICAL MOVEMENT.

1,188,790.   Specification of Letters Patent.   Patented June 27, 1916.

Application filed June 27, 1910. Serial No. 568,952.

*To all whom it may concern:*

Be it known that I, ELIAS H. KELLEY, a citizen of the United States, residing in the borough of Manhattan, city, county, and State of New York, have invented a new and useful Improvement in Mechanical Movements, of which the following is a description.

This invention relates to mechanical movements and particularly to one-revolution mechanisms involving a reciprocating clutch member.

Among the objects of my invention may be noted the following: to provide a mechanism by means of which rotary motion may be transformed into any desired motion through a transmission gear, for a single rotation of the driving-shaft; to provide a mechanism by means of which a clutch-device can be thrown into and out of operation automatically and maintained in operation for a predetermined period; to provide an automatic means for throwing a clutch into operation and simultaneously therewith, through electrically-operated means starting into operation the clutch-carrying shaft; to provide means whereby a clutch mechanism may be thrown automatically into and out of operation at predetermined periods and driven for a predetermined period and positively held from operation at the end of its functional movement; to provide a clutch mechanism wherein the driving member is moved into action with a combined right-line and rotary motion so as to avoid a perpendicular engagement of the clutch-faces; to provide a driving-member with a rotary reciprocating movement which is capable of conversion into unidirectional rotary motion; to provide a plurality of coöperating devices constituting a controlled clutch-mechanism and forming a "unit" which is capable of indefinite duplication on a single driving-shaft; and to provide a compact, automatic and positively-acting transmission mechanism involving an automatically-shifting clutch and an automatically-operating make and break contact-device as a part of an electric circuit for transforming one kind of motion into another kind of motion.

With the above objects in view, and others which will be detailed during the course of this description, my invention consists in the parts, features, elements and mechanisms, and combinations of elements and mechanisms as hereinafter described and claimed.

In order that my invention may be clearly understood, I have provided drawings wherein:

Figure 1 is a sectional elevation of my mechanical movement sufficient to illustrate its principles and mode of operation; Fig. 2 is a horizontal section of a portion of the mechanism shown in Fig. 1, parts being shown in plan; Fig. 3 is a sectional elevation of the buffer mechanism; Fig. 4 is a sectional elevation of a portion of the clutch-controlling mechanism; Fig. 5 is a perspective view of the controlling-drum; Fig. 6 is a plan view of the clutch-cylinder; and Fig. 7 is a plan view, partially in section and partially broken away, showing the electric circuit and driving means for the transmission shaft.

Referring to the drawings, the numeral 1 indicates the driving-shaft which will be journaled in suitable supports carried by the frame or bed 2, said driving-shaft carrying a drum composed of the disk 3, having the circumferential flange 4 and hub 5, through which latter the drum is secured to said shaft 1 by means of a spot or other screw 6. The flange of the drum is slotted as at 7 for coöperation with the pin 8, extending laterally from the head 9 of the lever 10, pivoted at its lower end 11 in the bearing 12, fixed to the bed 2, said bearing having the upright 13, provided at its upper end with a bifurcated head 14, between the arms 15 of which the lever 10 reciprocates and is guided and sustained from lateral movement. The upright 13, below its head 14, is provided with the transverse bore 16, through which extends a spiral spring 17, one end of which is connected to the depending-lug 18 of the head 14, and the other end of which is secured to the lever 10 by being hooked through the aperture 19. The function of the spring 17 is to normally hold the lever 10 in its retracted position shown in Fig. 1 and return the same to said position when released by the controlling drum. The head of the lever 10 is also provided with a forwardly-extending pin 20, which coöperates with the cam-groove 21 of the clutch-cylinder 22, the jog 23 of said cam-groove, in coöperation with the pin 20, effecting the longitudinal movement of said cylinder 22 on the driving-shaft 1, said cylinder being keyed to said shaft by means of the feather 24. The cylinder 22 is provided with a circle of clutch-teeth 25 at one end, which coöperate with a circle of clutch-teeth 26, formed on the hub 27 of the gear 28, which forms part of the transmission mechanism. The gear 28 is free to rotate upon the driving shaft 1, but is held from longitudinal movement thereon by means of the pin 29, fixed thereto and having one end running in the groove 30 of the hub 31, splined on and fixed to the driving-shaft 1 in any suitable manner, said hub carrying at its other end the disk 32, formed with the buffer-cam 33, which coöperates with the buffer-plug 34, held in the cap 35, under control of the spring 36, carried in the socket 37 of the post 38, secured to the end of the rack-bar 39, sliding in the groove 40 of the base 2, said rack-bar and buffer-post being held from vertical movement on the base by the cap-plate 41, rigidly secured by means of screws 42, to the said bed 2.

The rack-bar 39 is actuated by the coöperating segmental gear 43, fixed to the rock-shaft 44, journaled in the bearing 44ª, secured to the base 2, said rock-shaft 44 having at its opposite end the lower end of the lever 45, fixed thereto. The lever 45, at its upper end, is provided, if desired, with a handle 46, for manual operation, and between its ends is provided with the pin 47, which coöperates with the circumferential groove 48, in the end of the clutch-cylinder 22. The lever 45 is connected to the lever 10 for conjoint operation with the latter by means of the two-part connecting-rod, one portion 49 of which is pivotally connected at 50 to the lever 10 and the other portion 51 of which is pivotally connected at 52 to the lever 45. The rod-portion 49 is screw-threaded into the rod-portion 51 and the adjustment of one within the other is maintained by the jam-nut 53, as will be readily understood. The lever 45, in its movements, is guided in the bifurcated bearing 54, which may be secured in any suitable manner to the frame of the machine, as by the standard 55, forming a part of the bearing 45. The lever 45 is also provided with a contact-device 56, suitably insulated therefrom and located at any point desired along the length of said lever, the said contact-device coöperating with the usual spring-contacts 57, carried by the binding-posts 58, and the leads 59 of which form part of an electric circuit which may be employed for driving, for a suitable motor, the main or driving shaft 1. The lever 45 is also provided with the extension 60, having journaled thereon the anti-friction roll 61, in position to coöperate with the switch-cam 62, fixed to the rotary counter-shaft 63, as clearly shown in Fig. 1, this counter-shaft, according to my invention, being driven or actuated at any suitable high speed very much in excess of that of the driving-shaft 1 during the single rotation of the latter, it being remembered that the gear 28 of the driving-shaft 1 transmits its motion through suitable gearing either for an increase or decrease of speed relatively to the shaft 1, according to the demands of the machine in which my mechanical movement is employed.

Upon reference to Fig. 7, the circuit connections and means for operating the transmission shaft 1 will be readily understood. In this figure, the main shaft 1 is shown as provided with the cylinder 22, having the grooves 21 and 48, and carrying the controlling-drum 4. Beyond said drum, or to the left of the figure, the shaft 1 is provided with a cupped disk 66, fixed upon the shaft in any suitable manner and provided in its recess with the frictional material 67, in contact with the frictional driving-disk 68, loose upon the shaft 1, and having on its hub-extension 69 a sprocket-wheel 70, driven by a chain 71, from a sprocket on the motor-shaft 72, the motor being conventionally shown and indicated by 73. The shaft 1 also carries a collar 74, fixed thereon and against which one end of a coiled-spring 75 engages, the opposite end of the coiled-spring engaging the hub 69 and normally tending to press the disk 68 against the frictional material 67. In consequence, the drive of the motor, through the chain 71, will operate the disk 68, which in turn will drive the shaft 1 through the medium of the cupped disk 66. This friction-clutch mechanism is in all material respects substantially the same as that of my co-pending application Serial No. 533,638, filed December 17, 1909, for vending machines, and needs no further explanation here, as it is illustrated simply as a means for driving the shaft from a motor, the current from which may be utilized when the contacts in the circuit are bridged by the contact-device 56, in engagement with the spring-contacts 57. The positive lead of the circuit from the motor is indicated by 76, extending to one of the spring-contacts 57, the lead 77 extending from the other spring-contact 57, terminating at the negative binding-post of the generator. Thus it will be understood that, when the contact is made at 57, by shifting the lever 45 to cause its contact-device 56 to bridge the two contacts 57, the circuit will be closed and the motor will drive the shaft 1 for the purposes hereinafter set forth. This driving mechanism has been found efficacious in relations such as that herein described, since, when the shaft 1 is suddenly brought to a standstill by engagement of the buffer-cam 32 with the buffer-post 34, the same may occur with some shock. The shock, however, is not conveyed back to the motor by reason of the ability of the frictional-devices 68, 67, 66, to slip or move relatively. Furthermore, the said frictional driving-device is efficacious because, when the bridge is made at 57, the motor picks up gradually, thus giving the clutch-disk 68 time to properly drive the disk 66.
From the foregoing detail description, it will be readily understood, on viewing Figs. 1, 3 and 4, that the driving-shaft is held from movement by the buffer-cam 33 in contact with the buffer-post 38, and that the relative, inoperative position of the two levers 10 and 45 places the pin 47 of the latter in coöperation with the groove 48 of the cylinder 22 and holds the pin 8 of the lever 10 out of range of the flange 4 of the controlling-drum, and also the pin 20 of said lever 10 withdrawn from the cam-groove 21 of the cylinder 22. The corresponding position of the clutch-member 25 is that shown in Fig. 2, or out of operative engagement with the clutch-member 26. The corresponding position of switch-cam 62 is that shown in Fig. 1, which permits the levers 45 and 10 to assume the position of said Fig. 1 with the contacts 56 and 57 separated and the electric circuit open. The direction of rotation of the shaft 1 is that shown by the arrow $a$, in Fig. 1, the direction of rotation of the counter-shaft 63 being the opposite, as shown by the arrow $b$, in said figure; and it is to be noted that the form of the cam 62 is such as to give to the lever 45, by the abrupt surface 64, a rapid movement in the general direction of the arrow $b$, while the surface 65 of the cam provides for the dwell of the lever 45 in its extreme of movement for a definite period, thus providing for the closing of the electric circuit through the contacts 56 and 57 and the maintenance of the same for a definite period, and also for the entrance of the pin 8 of the lever 10 through the slot 7 of the flange 4 of the controlling-drum, and the maintenance of said pin within the drum also for a definite period, or until the shaft 1 can be driven sufficiently far to turn the slot 7 of said controlling-drum to a point where the pin cannot escape from the drum, but will be under the control of the flange 4 of the latter for a complete revolution of the shaft 1. Now assuming that the lever 45 is manually operated by grasping the handle 46 and rocking the same until its contact 56 is in engagement with the contacts 57, thus closing the electric circuit, the current of the latter, through the suitable motor and connections, will immediately operate the driving-shaft 1. The same movement of the lever 45 will, through the connection 51—49, move the lever 10 in the same general direction, thus causing its pin 20 to enter the cam-groove 21 of the cylinder 22 simultaneously with the recession of the pin 47 of lever 45 from the cam-groove 48 of said cylinder. At the same time, the pin 8 of lever 10 is moved through the slot 7 of the flange 4 of the controlling-drum, the arrangement of which latter on the shaft is such as to present said slot 7 in the direct path of movement of said pin 8 at the completion of every rotation of the driving-shaft 1. The movement of the lever 45 rocks the shaft 44, which in turn rocks the segment 43 and gives a right-line movement to the rack-bar 39, thus moving the buffer-post 38 from under the buffer-cam 33, thus leaving the driving-shaft free to be rotated by the electric motor. The operator will hold the lever 45 sufficiently long for the shaft 1 to be operated by its motor in the direction of the arrow $a$, Fig. 1, to enable the slot 7 of the controlling-drum to be passed beyond the range of the pin 8 of lever 10, so that the flange 4 of said drum will control the further movements and conditions of the buffer-post, lever 10 and lever 45. Rotation being imparted to the driving shaft 1, coöperation of the jog 23 of the cam-groove 21, with the pin 20 of the lever 10, will, because the latter is fixed from lateral movement, move the cylinder 22 lengthwise of the shaft 1 and drive its clutch-member 25 into coöperation with the clutch-member 26 of the gear 28. Thus the driving-shaft will operate the gear 28 and its rotary motion will, through suitable transmission mechanism, be imparted to the machine for a functional operation. The functional operation or operations will take place during the single rotation of the driving-shaft 1, at the end of which rotation the pin 8 will quickly pass through the slot 7 of the controlling-drum, thus permitting the lever 10 to assume the position of Fig. 1 under control of the spring 17, just as the jog 23 in the cam-groove 21 of cylinder 22 has caused the shifting of the latter to separate its clutch-member from the clutch-member 26, thus breaking the drive through the gear 28. The same movement of the lever 10 is imparted to the lever 45 and the rock-shaft 44, whereupon the buffer-post is moved back into position to coöperate with the buffer-cam 33 and thus bring the driving-shaft to a dead stop under the cushioning action of the buffer-plug 34.
The same operation just described is produced by means of the automatic device shown in Fig. 1, consisting of the rotary cam 62, in coöperation with the anti-friction roll 61, carried by the lever 45; that is to say, assuming that the shaft 63 is operated independently of the shaft 1 and that it has a number of rotations while said shaft 1 has a single rotation, the first action of the cam 62 will be to drive the lever in the general direction of the arrow $b$, through the medium of its abrupt surface 64, so as to close the circuit through the contacts 56 and 57. The main shaft being thus set in operation, as previously described, and the lever 10 passing under control of the drum, the lever 45 will thus be held in its circuit-closing position throughout all the other rotations of said cam 62, the dwell-surface 65 of said cam holding said lever 45 in its extreme position through a period sufficiently long for the shaft 1 to be rotated to enable the flange 4 of the controlling-drum to assume control of the lever 10 through its pin 8. Consequently, the subsequent rotations of the cam 62 will be idle and the cam-shaft 63 can be timed so as to impart any number of rotations to the cam 62 during the single rotation of the driving-shaft 1, all of which will be idle, in so far as the cam 62 is concerned, with reference to the lever 45; but, the shaft 63 may be provided with a transmission mechanism or device so that its rapid rotation may induce functional results in the machine to any extent desired, and as may be predetermined, relatively to and during the single cycle of movement of the driving-shaft 1.

It will be noted that the movement of the clutch-cylinder 22 is the resultant of its right-line movement along the shaft 1 and its rotary movement with said shaft, the purpose of which is to cause the clutch-faces 25 and 26 to effect an engagement with a relative sliding action. This prevents breaking down and wear upon the clutch-teeth, since perpendicular engagement of the clutch-faces is avoided and the latter go together slidingly and, hence, easily and quietly. This is an important feature of my invention, since the life of the mechanism is indefinitely prolonged, jarring and noise of the mechanism are avoided, and the drive is gradually begun and without shock.

Another important feature of my invention resides in the "unit" character of the mechanism which, as heretofore stated, enables it to be duplicated indefinitely on a single shaft without changing or modifying any of its elements, but enabling different results and functions to be performed therefrom. Note should also be taken of the fact that it requires but a light pressure upon the lever 45 to operate it and its joined lever 10 and a comparatively light spring to return them to normal position, this being because it is only necessary to enter the pins 20 and 47 into the slots of the cylinder 22 and retract said pins to cause the operation of said cylinder. The same is true with reference to pin 8, since the control of the clutch by the drum 4 is independent of the levers and the operation of the cylinder, in its right-line movements, is in the line of least resistance.

Having thus described my invention, what I claim and desire to secure by Letters Patent is:

1. In combination, a driving-shaft; a clutch mechanism carried by said driving-shaft; means for actuating said clutch mechanism to cause its parts to coöperate; a controlling-device for maintaining the clutch mechanism in operation for a predetermined period including a device rotatable with said driving-shaft; and a connection between said device and clutch actuating means.

2. In combination, a driving-shaft; a clutch mechanism carried by said driving-shaft, one of the members of which rotates with the shaft and the other of which rotates independently thereof; means for shifting one of said members into coöperation with the other; means for controlling the operation of said shiftable member including a device rotatable with said driving-shaft for holding the clutch members together during only a single rotation of the driving-shaft; and a connection between said device and shifting means.

3. In combination, a driving-shaft; a clutch mechanism mounted on said shaft, including two rotatable members; means for shifting one of said members into coöperation with the other; a rotating controlling-device also mounted on said shaft, upon which depends the operation of said shiftable member; a connection between the said device and shifting means; and means whereby the action of the controlling member may be regulated.

4. In combination a driving-shaft; means for normally and positively holding said shaft from rotation including a device carried by the shaft; a clutch-device carried by said driving-shaft, comprising two rotatable members; means whereby one of said members may be shifted into engagement with the other including a pair of joined levers; a hollow disk; means for controlling the operation of the shiftable member of the clutch carried by the shaft; and means for operating the controlling means and simultaneously operating the shaft-holding means.

5. In combination a driving-shaft carrying a two part clutch-device, one part of which is shiftable relatively to the other; a vibratory controlling-device for controlling the action of the shiftable part of the clutch; means for driving the main-shaft including an electric circuit and a contact-device; and a contact-device carried by the controlling mechanism for closing the circuit and driving the main shaft when the controlling mechanism is operated.

6. In combination a driving-shaft; means for actuating the driving-shaft including an electric circuit; a controlling mechanism having a contact-device for completing the circuit; a clutch-mechanism carried by the driving-shaft; and means whereby the controlling-mechanism may control the action of the clutch mechanism.

7. A driving-shaft; means for holding the same normally from operation; a clutch-mechanism carried by said driving-shaft; a controlling-device for said clutch-mechanism; means for actuating the driving-shaft including an electric circuit; and means included in the controlling-device for completing the circuit, shifting the shaft-holding means and actuating the clutch.

8. In combination a driving-shaft; a two-part clutch carried thereby; means for shifting one part of the clutch relatively to the other, said shifting means including a rotary controlling-drum carried by the driving shaft formed with a flange at an angle to its body and having a slot extending through said flange; and a connection between the same and the shiftable portion of the clutch.

9. In combination a driving-shaft; means for actuating said shaft; a clutch-mechanism comprising two parts one of which is shiftable relatively to the other; rotary means for controlling the action of said shiftable part, including a connection between one of the clutch parts and the controlling means, whereby the shaft will have imparted to it only a single rotation for a functional cycle of the mechanism.

10. In combination a driving-shaft; a clutch-mechanism carried thereby, one member of which is shiftable relatively to the other and one member of which is provided with a transmission-gear; means for actuating the shiftable member including a rotary-drum; and a vibratory connection between the same and said shiftable member.

11. In combination a driving-shaft; a clutch-mechanism carried thereby comprising two members one of which is shiftable relatively to the other; and a controlling mechanism for said clutch-mechanism including a hollow rotary disk, and a pair of levers joined together for movement in the same direction at the same time, connecting said rotary disk with said shiftable member of the clutch-mechanism.

12. In combination, a driving-shaft; two member carried by said shaft having coöperating faces; means for imparting rotary and reciprocating movements to one of said members relatively to the other; and a rotary drum having a peripheral flange provided with an open end slot for determining the duration of said movement.

13. In combination, a driving-shaft; clutch-members carried by said shaft, one of which has a cam-groove in its periphery and is splined to said shaft; means on the coöperating faces of the clutch-members enabling them to have a sliding clutch engagement; and means for shifting said grooved member on said shaft while the two are rotating together, so as to cause engagement of the members by a rotary sliding movement.

In testimony whereof I have hereunto signed my name in the presence of two subscribing witnesses.

ELIAS H. KELLEY.

Witnesses:
CHAS. McC. CHAPMAN,
M. E. HILLOCK.